United States Patent
Nilson

[11] Patent Number: 5,845,817
[45] Date of Patent: Dec. 8, 1998

[54] SELF-CLOSING DISPENSING DEVICE

[75] Inventor: Billy Nilson, Mjölby, Sweden

[73] Assignee: Cenova AB, Sweden

[21] Appl. No.: 704,653

[22] PCT Filed: Jan. 24, 1995

[86] PCT No.: PCT/SE95/00065

§ 371 Date: Nov. 12, 1996

§ 102(e) Date: Nov. 12, 1996

[87] PCT Pub. No.: WO95/25051

PCT Pub. Date: Sep. 21, 1995

[30] Foreign Application Priority Data

Mar. 15, 1994 [SE] Sweden .................................. 9400863

[51] Int. Cl.$^6$ .................................................. B65D 37/00
[52] U.S. Cl. ......................... 222/209; 222/213; 222/494
[58] Field of Search .................................... 222/209, 213, 222/491, 494, 517; 137/846

[56] References Cited

U.S. PATENT DOCUMENTS

| | | | |
|---|---|---|---|
| 2,028,843 | 1/1936 | Pischke | 222/491 |
| 3,858,773 | 1/1975 | Del Bon | 222/494 |
| 4,179,051 | 12/1979 | Thomas | 222/494 |
| 4,776,495 | 10/1988 | Vignot | 222/494 |
| 4,927,061 | 5/1990 | Leigh et al. | 222/212 |
| 5,099,885 | 3/1992 | Nilsson | 137/852 |
| 5,190,190 | 3/1993 | Fudalla | 222/494 |

FOREIGN PATENT DOCUMENTS

| | | | |
|---|---|---|---|
| 151767 | 1/1988 | Denmark . | |
| 2 403 055 | 4/1979 | France . | |
| 436054 | 10/1926 | Germany | 222/491 |
| 1 917 391 | 8/1969 | Germany . | |
| 432 406 | 4/1984 | Sweden . | |
| 465 556 | 9/1991 | Sweden . | |

OTHER PUBLICATIONS

PCT International Search Report dated Jun. 27, 1995 (4 pages).

*Primary Examiner*—Joseph A. Kaufman
*Attorney, Agent, or Firm*—Finnegan, Henderson, Farabow, Garrett & Dunner, L.L.P.

[57] ABSTRACT

A device for dispensing a flowable substance, which includes a rigid open channel or basin-shaped first main part having a dispensing channel with a dispensing opening, and a basin- or channel-like second main part which is comprised of a resilient material and has a shape complementary to the first main part, wherein the first main part and the second main part are joined together to form a closed dispensing container, and wherein the second main part has an end wall that includes a closure part which is complementary to the dispensing channel of the first main part and which lies resiliently against the dispensing opening. Pressure applied to the upper part of the end wall causes it to pivot on pivot points causing the closure part to swing upwardly and open the dispensing opening to permit discharge of the substance.

6 Claims, 7 Drawing Sheets

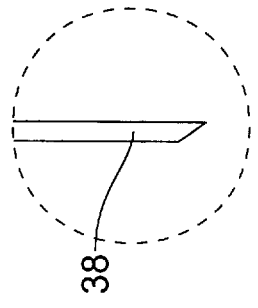
FIG. 5c
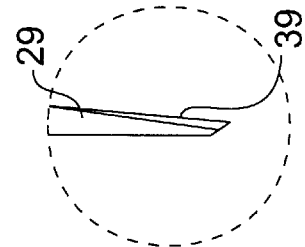
FIG. 5e
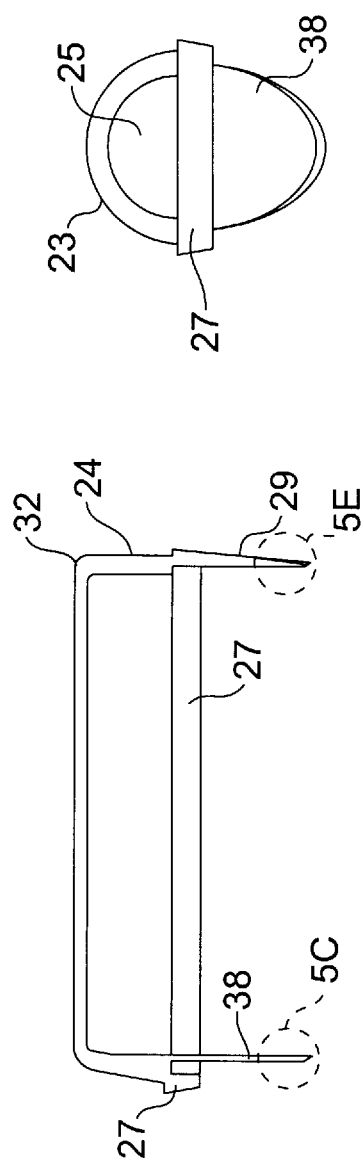
FIG. 5b
FIG. 5a
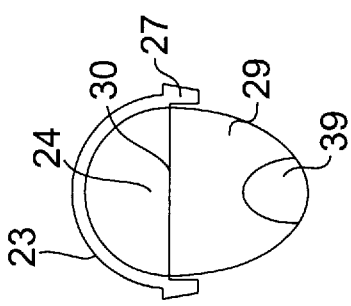
FIG. 5d

SELF-CLOSING DISPENSING DEVICE

TECHNICAL FIELD

The present invention relates to a self-closing dispensing device which enables viscous or powder substances, such as liquid foodstuffs of different kinds, such as fruit juice, cooking oil, soya, mustard, mayonnaise, ketchup, chemical-technical products, such as glue, furniture oil, shoe cream, dishwashing agents or medicaments in the form of creams, pastes, powder or liquid substances, to be dispensed from a container in metered quantities, said self-closing device including a rigid, open channel or cup-shaped first main part having a channel-shaped outlet or dispensing opening, and a bowl-shaped or channel-like second main part which is made of a resilient material and whose shape is complementary to the shape of the first main part and which is intended to be joined to said first main part to form a closed dispensing container, wherein the second main part is also provided with a resilient closure part which is complementary to the outlet part of said first main part and lies resiliently against said outlet opening.

DESCRIPTION OF THE BACKGROUND ART

Many different types of self-closing devices for dispensing viscous substances from different types of containers are known to the art. These devices are often technically complicated and difficult, and therewith expensive to manufacture, or are of simple design and have a short effective life.

Examples of known devices of this nature are described and illustrated in SE B 465556, DK B 151767, DE B 1917391 and U.S. Pat. No. 5,099,885. SE B 465556 discloses a dosage pump having an inlet valve and an outlet valve. The opening and closing of said valves depends entirely on the internal pressure in the device.

BRIEF DISCLOSURE OF THE INVENTIVE CONCEPT

An object of the present invention is to provide a self-closing device for dispensing container-carried substances which is not encumbered with the drawbacks and disadvantages of known devices of this kind.

To achieve the objects and in accordance with the purpose of the invention, as embodied and broadly described herein the dispensing device of this invention comprises a rigid first main part having side walls and formed in the shape of an open channel and having at one end a channel-shaped dispensing opening, and a second main part which is formed in the shape of a channel and comprised of a resilient material and having a shape complementary to the first main part so that the first main part and the second main part can be joined together to form a closed dispensing container, the second main part having a closure part which is complementary to the dispensing opening of the first main part and which lies resiliently against the dispensing opening at an angle thereto, the resilient end-wall which contacts the side walls of the first main part of two places located inwardly of the dispensing opening, and the closure wall which is formed integrally with the resilient end-wall and, in a non-assembled state, is located essentially in a plane with the end-wall and having a length which is greater than the depth of the open channel such that, in an assembled state, the closure wall constitutes the closure, the end-wall having a material thickness which is greater than the material thickness of the second main part other than an end-wall such that during operation said second main part will be deformed elastically in the vicinity of the end-wall and to a greater extent than the end-wall whereby pressure applied to the end-wall will cause the wall to pivot at the two places against a spring force that derives from the deformation of the second main part and the closure to swing away from the dispensing opening of the first main part.

In accordance with the inventive concept, there is provided an easily handled device which can be readily fitted to different types of containers with the aid of different attachment methods, which can be manufactured easily, which has a relatively long effective life, and which is flexible in many respects.

BRIEF DESCRIPTION OF THE DRAWINGS

The invention will now be described with reference to the accompanying drawings, in which

FIGS. 5a–5e illustrate parts of the device shown in FIG. 4;

DETAILED DESCRIPTION OF A PREFERRED EMBODIMENT OF THE INVENTION

Figure 1:
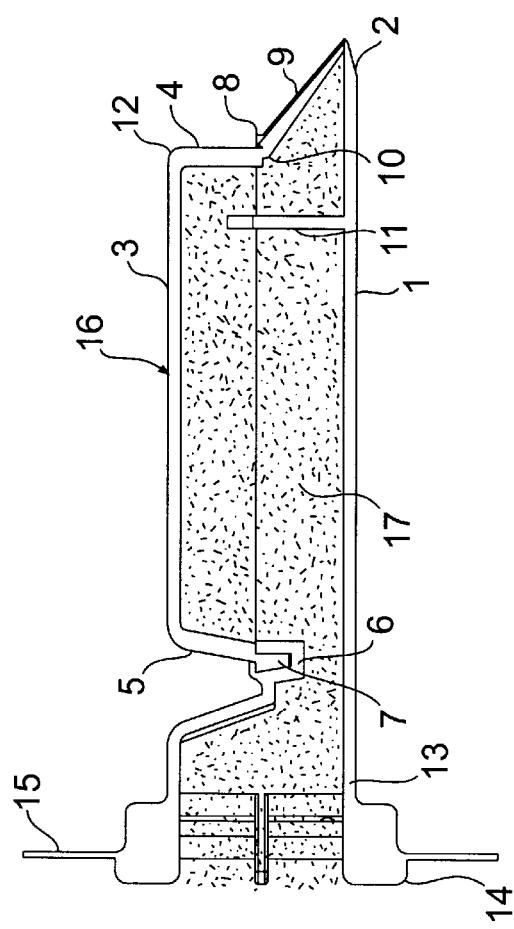
FIG. 1 is a sectioned side view of a first embodiment of the invention.

As shown in FIG. 1, the inventive device includes a first main part 1, which has the form of a relatively rigid, semi-cylindrical channel provided with an outlet or substance dispensing part 2. The device also includes a second main part 3 which also has a semi-cylindrical form and which is provided at each end with a respective end-wall 4, 5 extending at right angles to the longitudinal axis of the cylinder. A groove 6 extends around the channel 1 with the exception of the region of the dispensing opening 2. A bead 7 complementary to the groove 6 extends around the edge of the second main part 3, with the exception of the region of the dispensing opening 2. When the channel 1 is joined to the main part 3, a metering container 16 is formed. When the channel and the main part are assembled together, the end-wall 4 will lie against the walls of the channel 1 at solely two points 8 and 8' respectively. Extending from the end-wall 4 is a closure wall 9 which in a non-assembled state constitutes an extension of the end-wall 4. The length of the closure wall 9 may be greater than the depth of the channel 1 and has in general the form of a semi-ellipse. When assembling the two main parts together, the closure wall 9 is curved resiliently to an oblique position in which the wall 9 sealingly abuts the inside of the dispensing opening 2.

The main part 1 is relatively rigid, whereas the second main part 3 is made of 5a resilient material. The end-walls 4, 5 are thicker than the remaining wall of said main dispensing part. A bend directive 10 is provided between the end-wall 4 and the closure part 9. The channel 1 includes adjacent the dispensing part 2 a wall 11 which extends transversely to the longitudinal axis of the channel. The wall 11 is located with respect to the dispensing opening 2 so that in operation the corner 12 between the end-wall 4 and the main part 3 will lie generally against the wall 11 as the end-wall 4 swings about the abutment points 8, 8'. The transverse wall 11 can be said to delimit the outlet part or dispensing part 2 to the channel 1. The channel 1 also includes an inlet part 13 which merges with a circular reinforcing part 14 provided with a connection flange 15 for connecting the dispensing container 16 to a substance container, not shown. Substance 17 is able to flow freely from the container down into the dispensing container 16.

Figure 3:
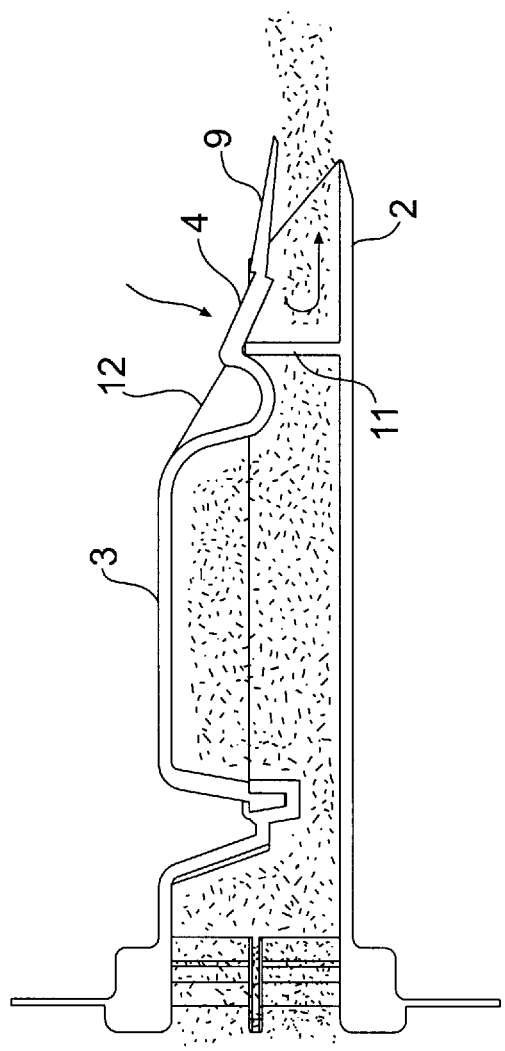
FIG. 3 illustrates the dispensing state of the device shown in FIG. 1.

FIG. 3 illustrates how the dispensing container 16 is used to dispense a given quantity of substance. The user presses on the upper part of the end-wall 4, this wall being more rigid than the remainder of the upper dispenser part 3, causing the wall to pivot on the abutment points 8, 8' down towards the transverse wall 11 and seal thereagainst, without any appreciable deformation. The second main part 3 will therewith buckle or deform elastically in the immediate vicinity of the corner 12 and therewith exert a counter directional spring force on the end-wall 4. At the same time, the closure wall 9 will swing-up together with the end-wall 4 and therewith open the dispensing part 2, wherein the substance present in a defined quantity in the dispensing part 2 is able to flow therefrom. By providing the transverse wall 11 with passageways or openings, it is also possible to obtain a continuous discharge of the substance, provided that the end-wall 4 is activated. When the end-wall 4 is released, the wall will swing back to its original position by the spring force exerted by the deformed part of the second main dispenser part 3, and the closure wall 9 again seals the dispensing part 2. As will be seen from FIG. 1, material can again flow past the transverse wall 11 and into the dispensing part 2. One important advantage afforded by this embodiment is that two very distinctive end positions are obtained with regard to the pivotal movement of the end-wall 4, and therewith a unique opening of the dispensing container.

Figure 2:
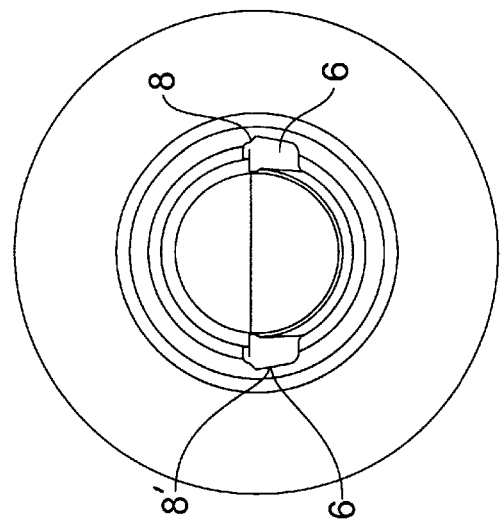
FIG. 2 is an end view of the outlet or dispensing end of the device shown in FIG. 1.
Figure 4:
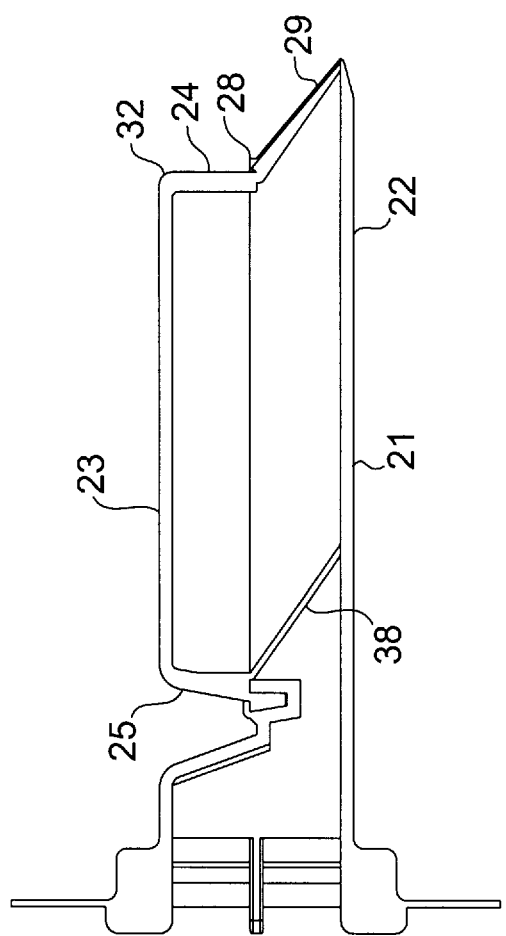
FIG. 4 illustrates a second embodiment of the inventive device.

FIG. 4 illustrates how the construction can be easily modified for more conventional use. The component parts of the dispenser have been referenced with the same numerals as those used in FIGS. 1–3 but with the addition of "20". Thus, the channel 1 is numeral 21, the bend directive 10 is numeral 30, etc. The embodiment illustrated in FIG. 4 differs from the embodiment illustrated in FIGS. 1–3 by virtue of the exclusion of the wall 11. Another difference is that the second end-wall 25 is provided with a check valve 38 in the form of a resilient wall which in a non-assembled state forms in one plane an extension of the end-wall 25. The valve 38 is semi-elliptical in shape and has a length which is greater than the depth of the channel 21. The valve 38 will thus seal against the inner wall of the channel 21 in the same way as the closure wall 9 of the earlier embodiment of FIGS. 1–3.

FIGS. 5a–5e illustrate component parts of the inventive device of FIG. 4, primarily the second main part 23 in a non-assembled state. FIG. 5a clearly shows the bead 27 extending around the free edge of the second main part 23, and also shows that the valve 38 and the closure wall 29 form extensions of respective end-walls 24, 25 in a non-assembled state of the dispenser. FIG. 5b is an end view of the portion of the main part 23 located proximal to the inlet part 33 (not shown). It will be clearly seen that the bead 27 and the valve 38 have an elliptical shape.

It will be seen clearly from FIGS. 5b and 5c that the edge of the valve 38 is beveled gradually away from the bead 27, with the widest bevel located at the apex of the ellipse. FIG. 5d shows the outlet or dispensing end of the second main dispenser part 23, including the end-wall 24, the elliptical closure wall 29 and the bend directive 30. FIG. 5d also shows clearly that the bead 27 terminates at the end-wall 24. The outer surface of the closure wall 29 may be provided with an elliptical recess 39, the purpose of which will be described in more detail below. The edge of the closure wall 29 is bevelled gradually in the same way as the valve 38. it will be understood that such bevelling, and also the full design of the second main part 23, with the exception of the valve 38, may also be applied to the embodiment illustrated in FIGS. 1–3.

Figure 6:
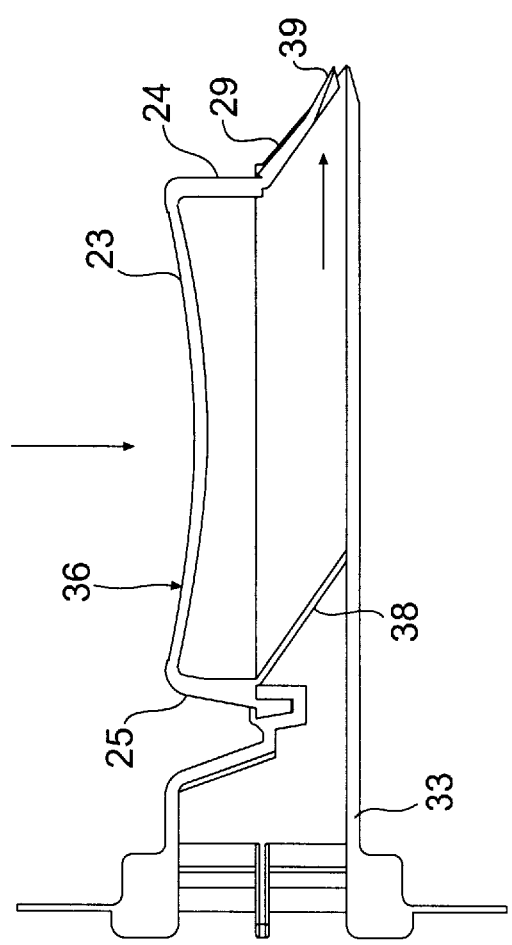
FIG. 6 illustrates a first dispensing state of the device shown in FIG. 4.

FIG. 6 is intended to show that a light pressure applied essentially in the centre between the two end-walls 24, 25 will increase the pressure within the dispensing container 36. The check valve 38 prevents this internal pressure from propagating to the inlet part 33. Since the apex of the closure wall 29 has been provided with a thinner elliptical recess 39, this thinner part of the wall will be bent outwards by the relatively small pressure increase, therewith opening the dispenser. The closure wall 29 is not affected essentially in this regard. The outlet or dispensing openings provided with this embodiment of the inventive dispenser are very small, which makes the device suitable for dispensing very low viscous substances.

Figure 7:
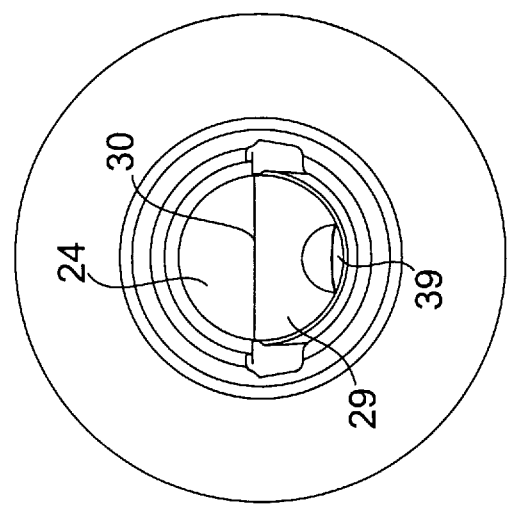
FIG. 7 is an end view of the outlet opening shown in FIG. 6.

FIG. 7 is an end view of the dispensing part shown in FIG. 6, and illustrates the very small dispensing opening formed by the thinner recess 39.

Figure 9:
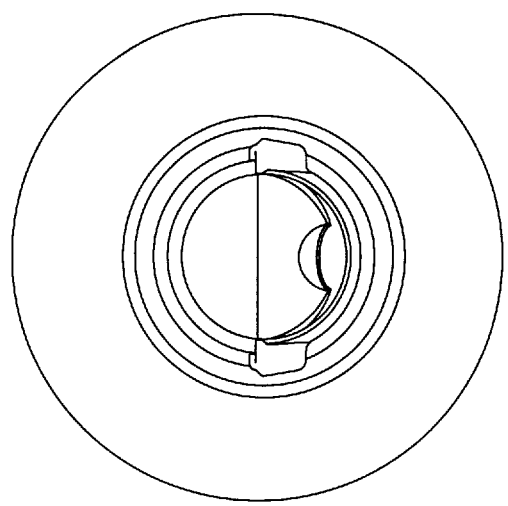
FIG. 9 is an end view of the outlet opening in the dispensing state shown in FIG. 8.
Figure 8:
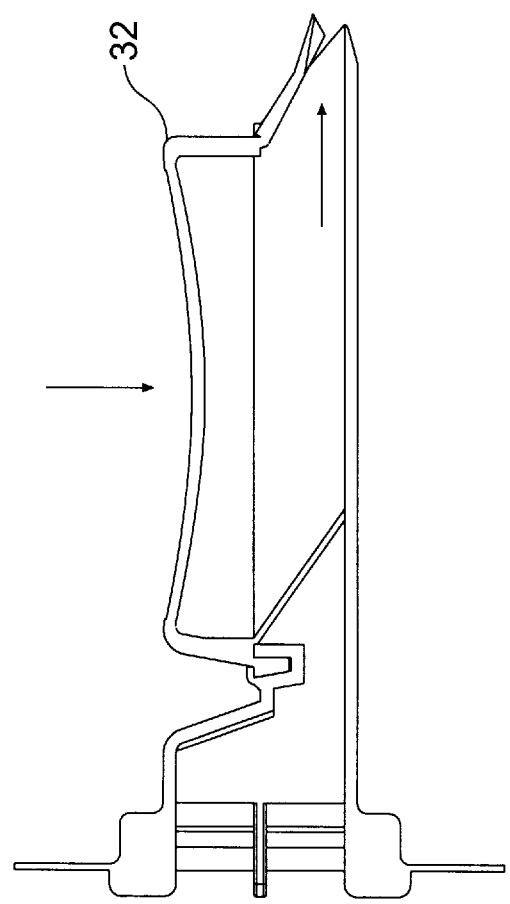
FIG. 8 illustrates a second dispensing state of the device shown in FIG. 4.

FIGS. 8 and 9 are intended to show that a heavier pressure will cause the whole of the end-wall to swing out and open wider the dispensing part 22. Opening of the dispensing part 22 is assisted to some extent by the tension force that acts on the corner 32 as the second main dispenser part 23 is heavily deformed between the end-walls 24 and 25.

Figure 10:
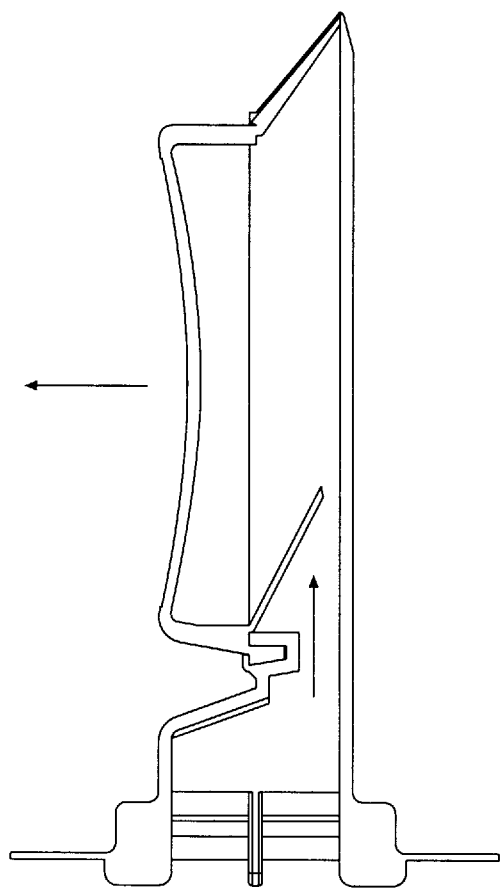
FIG. 10 illustrates the pumping state of the device shown in FIG. 4.

In the FIG. 10 illustration, the closure wall 29 has returned to its starting position and closed the dispensing part 22 as a result of the decrease in pressure that occurs when the pressure on the second main part 23 ceases, and as a result of the second main part striving to return to its original shape. Because the decrease in pressure cannot be compensated for through the closed dispensing part 22, the pressure decrease will instead be compensated by the supply of substance through the valve 38. This method of pumping material into the dispensing container may also be applied in the initial stage when the container is empty, so as to fill the container ready for use.

MODIFICATIONS OF THE INVENTION

It will be understood that the described and illustrated embodiments of the invention can be modified within the scope of the following Claims. The second main dispenser part can be made from any one of a number of different materials, for instance from a plastic material such as polyethylene or polypropylene.

The design of the main dispenser parts may be varied in different ways and need not, for instance, be cylindrical throughout, but may have any desired cross-sectional shape. For instance, the dispensing part or outlet part may have a generally rectangular or square cross-sectional shape.

In the case of the illustrated embodiments, the dispensing container has the same width as the substance dispensing part. It will be understood, however, that the dispensing part may have any appropriate shape, for instance a circular or rectangular shape in plan view.

The parts can be joined together in different ways, for instance by welding, gluing or the like.

I claim:

1. A device for dispensing a flowable substance, comprising a rigid first main part having side walls and formed in the shape of an open channel and having at one end a channel-shaped dispensing opening, and a second main part which is formed in the shape of a channel and comprised of a resilient material and having a shape complementary to the first main part so that the first main part and the second main part can be joined together to form a closed dispensing container, the second main part having a closure part which is complementary to the dispensing opening of the first main part and which lies resiliently against said dispensing opening at an angle thereto, a resilient end-wall which contacts the side walls of the first main part at two places located inwardly of the dispensing opening, and a closure wall which is formed integrally with said resilient end-wall and, in a non-assembled state, is located essentially in a plane with said end-wall and having a length which is greater than the depth of the open channel such that, in an assembled state, the closure wall constitutes the closure, said end-wall having a material thickness which is greater than the material thickness of the second main part other than an end-wall such that during operation said second main part will be deformed elastically in the vicinity of said end-wall and to a greater extent than said end-wall whereby pressure applied to said end-wall will cause said wall to pivot at said two places against a spring force that derives from the deformation of said second main part and said closure to swing away from the dispensing opening of said first main part.

2. A device according to claim 1, wherein the channel-shaped dispensing opening is delimited by a surface which is inclined to a longitudinal axis of said first main part, and said closure is bent or curved into abutment with said inclined surface.

3. A device according to claim 1, further comprising a wall located in the open channel adjacent the dispensing opening and extending transversely to the longitudinal axis of said channel, said end-wall pivoting into sealing abutment with said wall upon the application of pressure to said end-wall.

4. A device according to claim 3, wherein the transverse wall is provided with openings which enable a flowable substance to be dispensed continuously.

5. A device according to claim 1, wherein the first and second main parts delimit an inlet channel having an inner surface, and said second main part includes a valve part in said inlet channel, said valve part being formed integrally with said second main part and having a length which is greater than the depth of the inlet channel, the valve part being elastically bent into resilient abutment with the inner surface of the inlet channel, so as to enable flowable substance to enter the dispensing device but preventing the outflow thereof.

6. A device according to claim 5, wherein the second main part includes a second end-wall located adjacent the inlet channel, and a part of said second end-wall having a material thickness greater than the material thickness of the second main part other than an end wall.

* * * * *